T. ALLATT.
TEARING MACHINE.
APPLICATION FILED JULY 25, 1916.

1,255,270.

Patented Feb. 5, 1918.
6 SHEETS—SHEET 1.

Attest:

Inventor:
Thomas Allatt
by
Raegener & Matthy Atty's

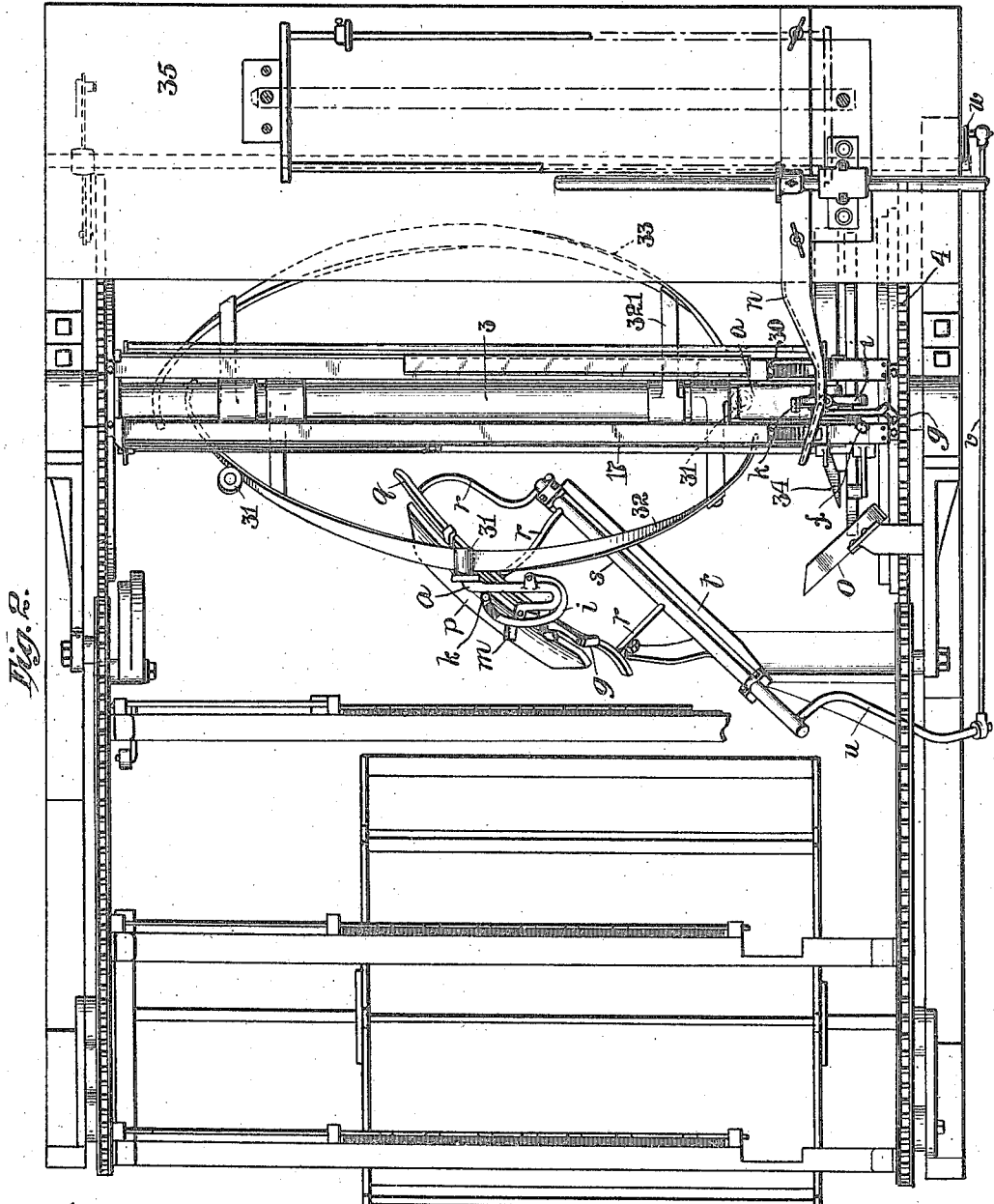

T. ALLATT.
TEARING MACHINE.
APPLICATION FILED JULY 25, 1916.
1,255,270.
Patented Feb. 5, 1918.
6 SHEETS—SHEET 3.
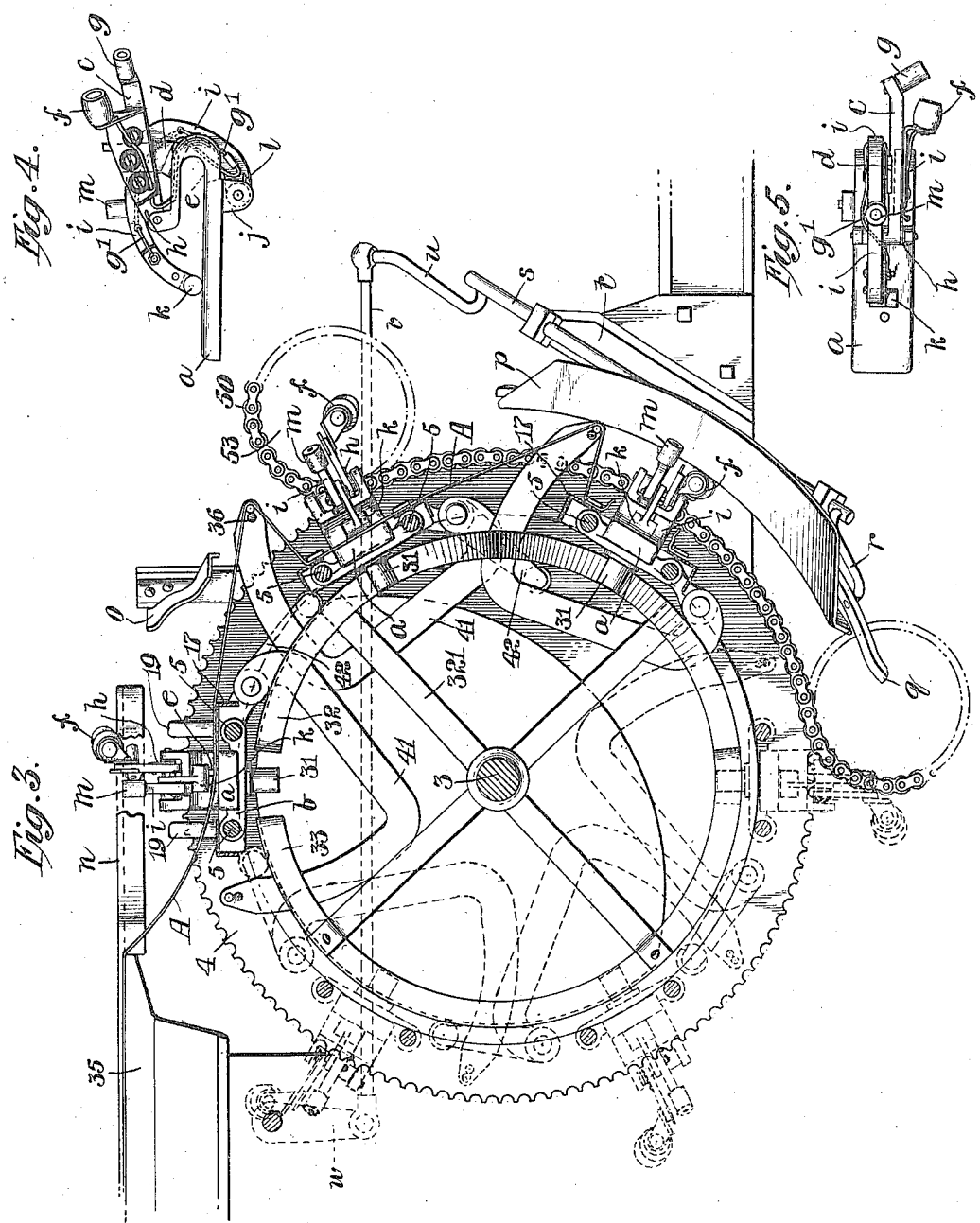

T. ALLATT.
TEARING MACHINE.
APPLICATION FILED JULY 25, 1916.
1,255,270.
Patented Feb. 5, 1918.
6 SHEETS—SHEET 4.
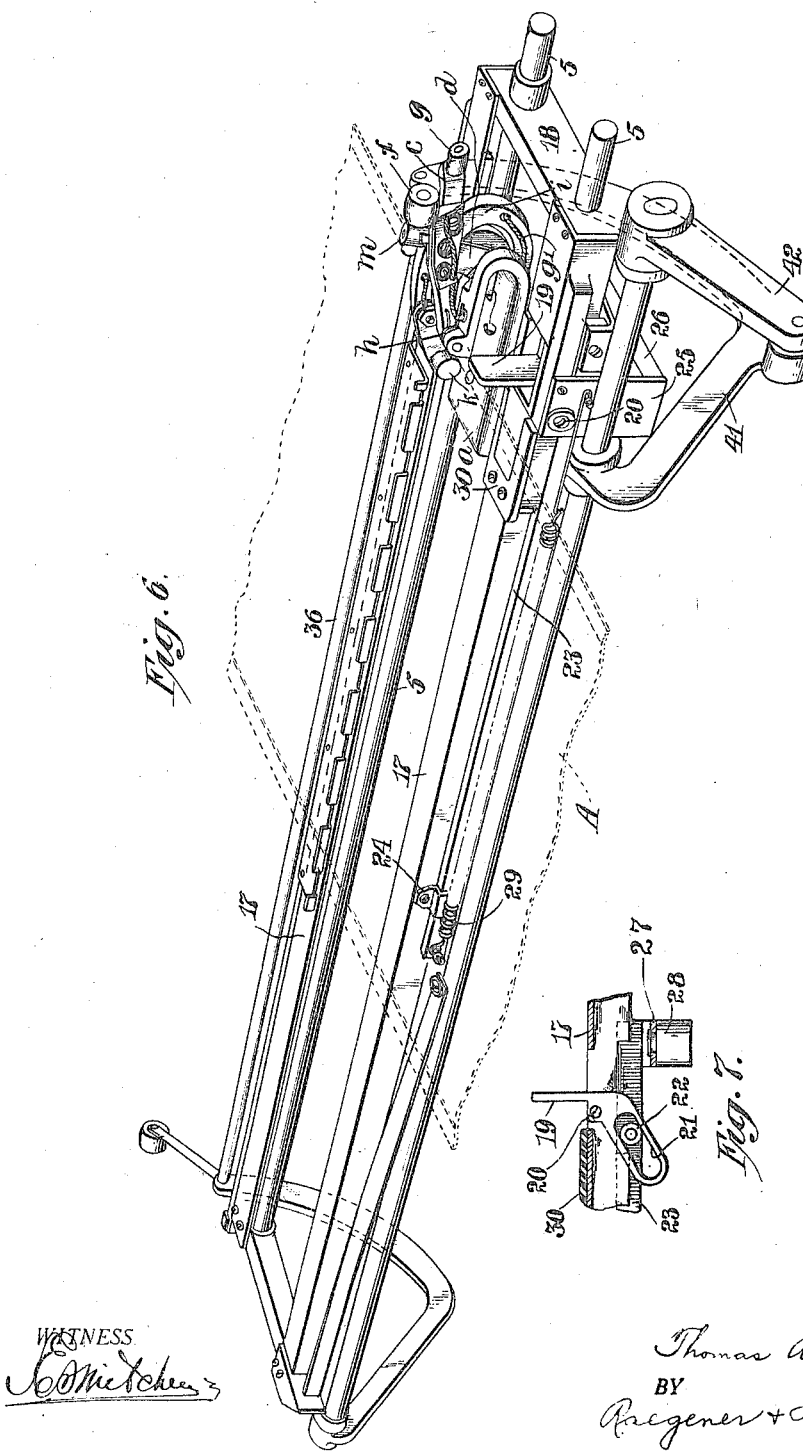
INVENTOR.
Thomas Allatt
BY
Riegener & Matty
ATTORNEYS.

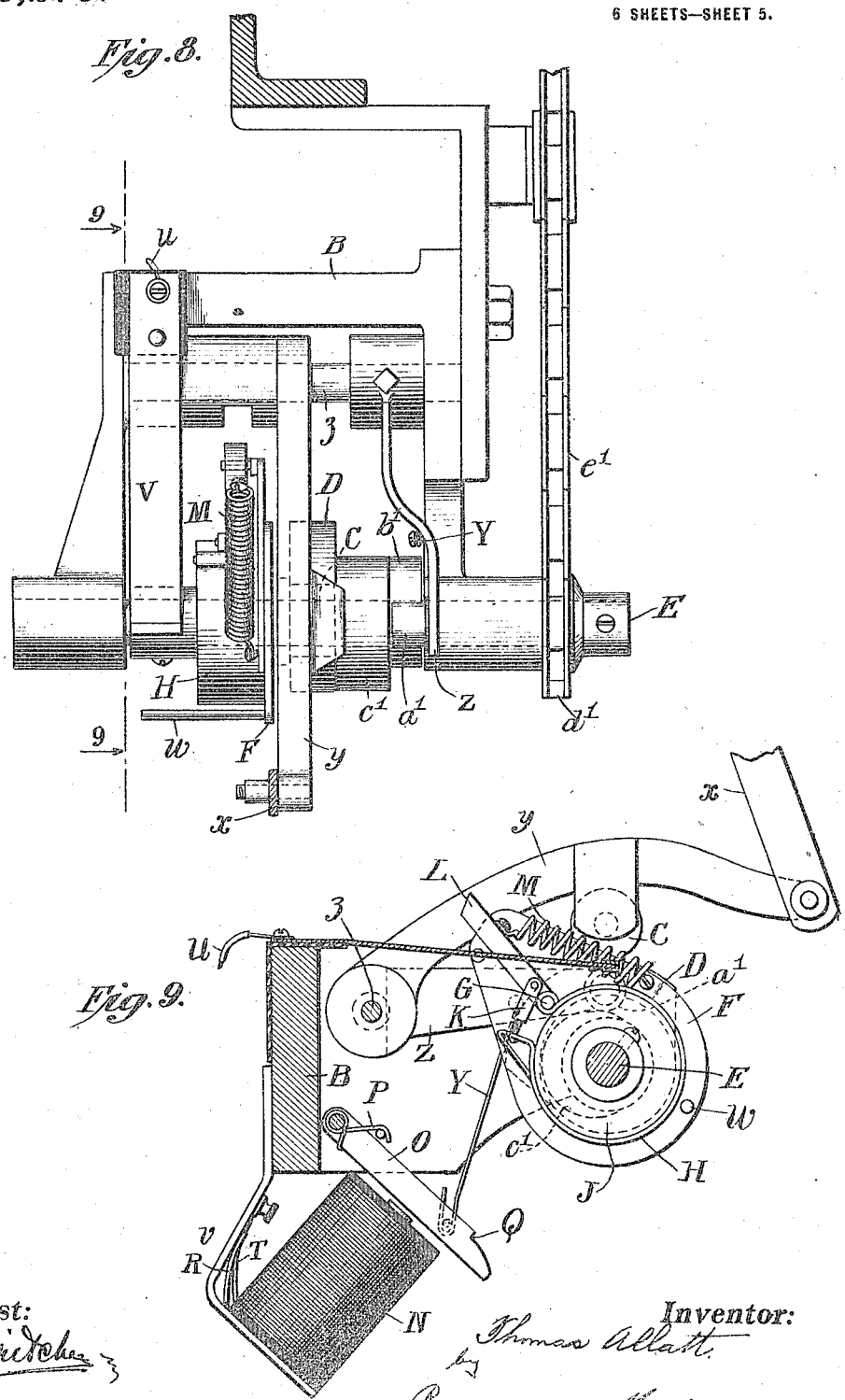

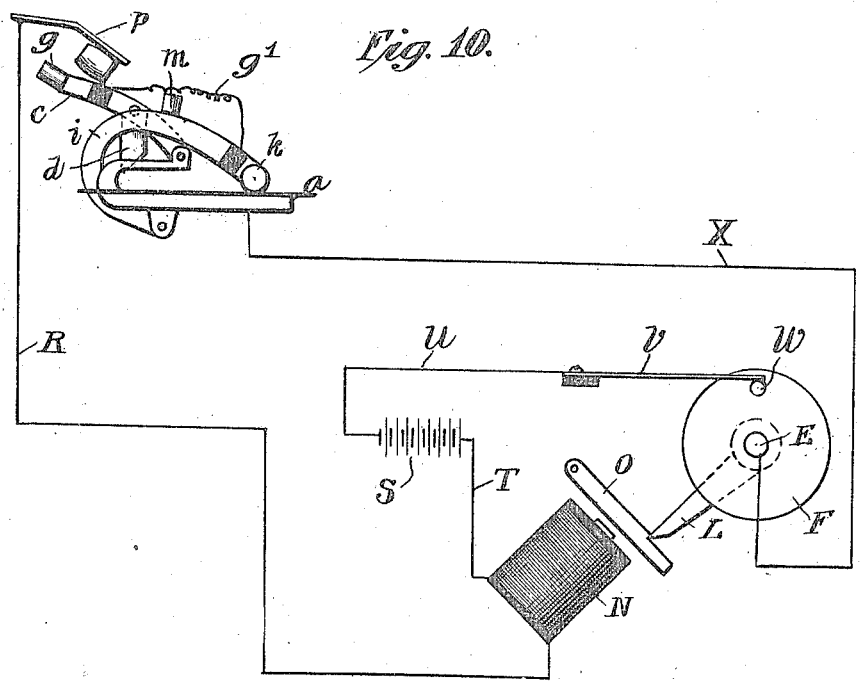

UNITED STATES PATENT OFFICE.

THOMAS ALLATT, OF NEW BRIGHTON, NEW YORK, ASSIGNOR TO HERRMANN AUKAM & CO., OF NEW YORK, N. Y., A CORPORATION OF NEW YORK.

TEARING-MACHINE.

1,255,270.  Specification of Letters Patent.  Patented Feb. 5, 1918.

Application filed July 25, 1916. Serial No. 111,122.

*To all whom it may concern:*

Be it known that I, THOMAS ALLATT, a British subject, and a resident of New Brighton, in the county of Richmond, New York city, and State of New York, have invented certain new and useful Improvements in Tearing-Machines, of which the following is a specification.

This invention relates to a machine for tearing cloth, more particularly to a machine designed to tear cloth that is hemmed on two sides into small pieces to be used as handkerchiefs.

To the accomplishment of the above objects and to such others as may hereinafter appear, the invention comprises a machine upon which is mounted a plurality of tearers arranged to tear a long strip of material, hemmed on both sides, transversely into a number of relatively small pieces.

In the making of handkerchiefs in large quantities it is customary to cut the material in very long strips, the width of the strips depending upon the desired size of the handkerchiefs. These long strips are then fed between two automatic hemstitching machines which suitably hem both sides of the long strip of material which together with other similarly hemmed strips of material are piled one above the other and cut transversely into suitable short lengths, the unhemmed edges of which are later hemmed by means of a hand operated hemstitching machine.

The above method is not very satisfactory as it is very difficult in cutting the long strips transversely when several strips are piled one upon the other, to have the cut edges square with the previously hemmed sides, and when the edges are not square imperfect handkerchiefs are made that pucker, the same being in many other ways unsatisfactory.

The machine made in accordance with the present invention is arranged to cut the first hem, then tear the intervening fabric between the two hems, and then cut the second hem to sever the material, the machine being arranged to cut and tear the material in suitable lengths continuously and without interruption.

The present invention is to be described in reference to the machine shown in my copending application Serial No. 86,273 filed March 23, 1916.

I will now proceed to describe my invention with reference to the accompanying drawings, and will then point out the novel features in claims. In said drawings:

Fig. 2 is a plan of the machine showing one tearer carriage the others being removed from the tearer-drum together with other parts for clearness of illustration.

Fig. 3 is an enlarged view in cross-section of the tearer-drum with parts broken away.

Figs. 4 and 5 are detail views of the tearer.

Fig. 6 is an enlarged detail perspective view of one of the tearer-carriages.

Fig. 7 is a detail view in cross-section of one of the gripping fingers.

Figs. 8 and 9 are enlarged detail views of the electrically controlled tripping device.

Fig. 10 is an electrical diagram showing the electrical connections between the tripping device and the tearers.

Figure 1:
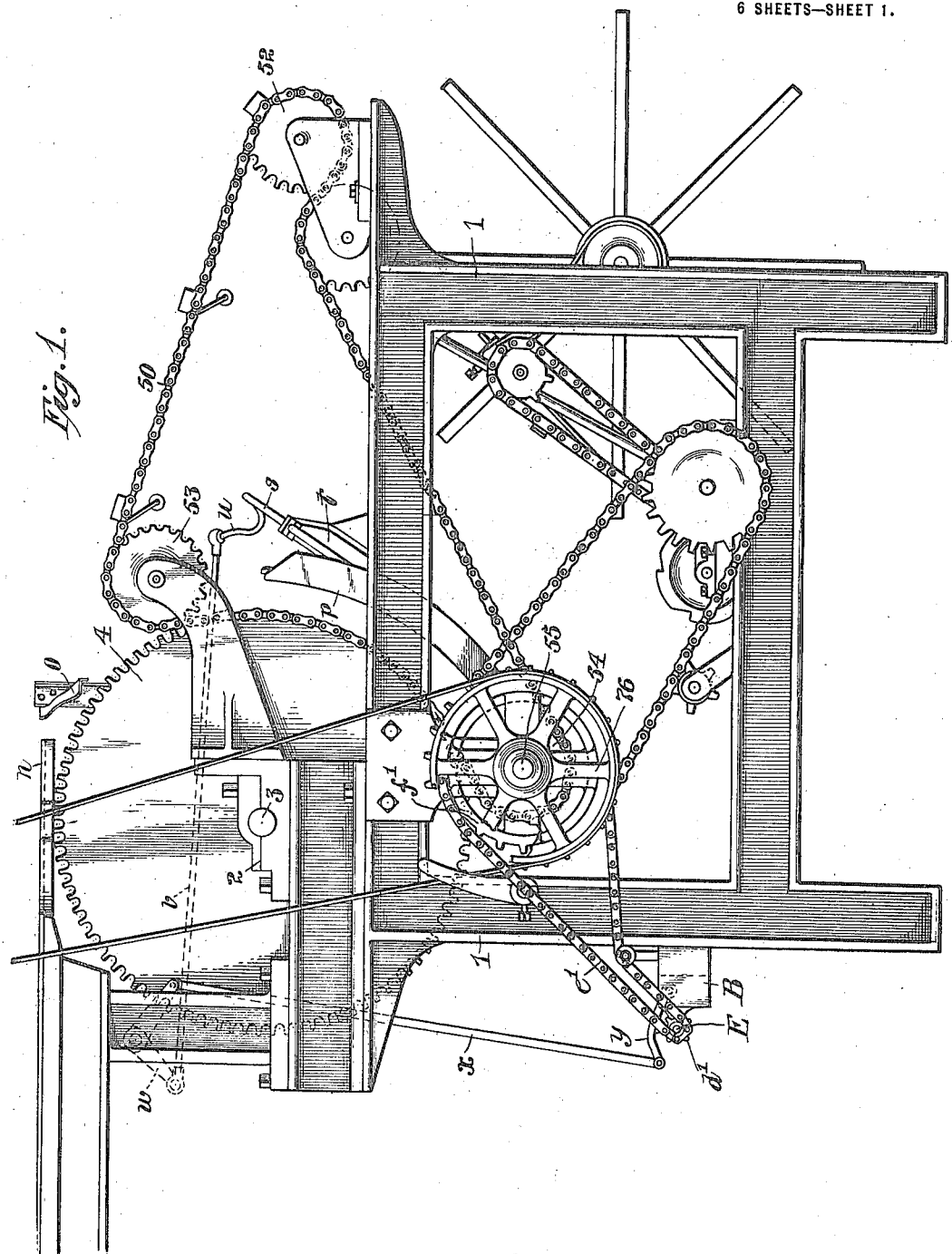
Figure 1 is a side elevation of the left hand side of a tearing machine made in accordance with the invention.

In the drawings, 1 designates the frame of the machine upon which is mounted, in suitable bearings 2, a stationary shaft 3 which supports near each end, adjacent the inner sides of the frame, the large rotatably mounted sprocket wheels 4 which support a series of tearer-carriages, in the present instance six in number, about the periphery thereof to form a tearer-drum.

Each tearer-carriage, one being shown in Fig. 4, is provided with two parallel rods 5 the ends of which are secured to the inner sides of the sprocket wheels 4. Upon the guide rods 5 is slidably mounted a tearer comprising a hooked bearing shoe $a$, constituting the tearer proper, which is secured to a base plate $b$ having sliding bearings through which the guide rods 5 pass, whereby said tearer may slide back and forth over said guide rods.

To the top of the bearing shoe $a$ is pivoted one end of a cutting lever $c$, to which is secured a knife $d$ having an inclined sharpened edge, which is adapted to pass through a suitable slot $e$, in the bent portion of the bearing shoe $a$. The cutting lever $c$ is, in the present instance, provided with two rollers $f$ and $g$, which are arranged to be engaged, as later described, to operate the knife which is normally held in retracted position, as shown in Fig. 4, by means of a suitable coiled spring $h$. The roller $f$ is, in the present instance, supported on the cutting lever $c$ so as to be electrically insulated therefrom.

The bearing shoe $a$ is also provided, in the present instance, with a bent contact lever $i$, the lower end of which is pivotally supported on suitable lugs $j$ secured to the underside of the bearing shoe $a$. To the free end of the contact lever $i$ is secured a contact member $k$ which is electrically insulated from the lever but electrically connected to the roller $f$ by means of a flexible insulated wire $g'$ which is threaded through suitable holes in the levers $c$ and $i$. The contact member $k$ is normally held in engagement with the working surface of the bearing shoe $a$, as shown in Fig. 4, by means of a suitable coiled spring $l$. The contact lever $i$ is provided with a roller $m$ which is arranged to be engaged, as later described, to operate the contact lever. In the present instance the rear end portion of the bearing shoe $a$ is suitably recessed to permit of the contact lever $i$ assuming the position shown in Fig. 4.

Upon the outer ends of the guide rods 5 is supported a tearer-frame comprising the longitudinal angle-bars 17 secured together at their ends, the transverse-angle bars 18 being provided with suitable holes through which the guide rods pass to support the tearer-frame. The tearer-frame is arranged to be supported, as shown, on the guide rods 5, so as not to interfere with the sliding movement of the tearer, the upper portion of the hooked bearing shoe $a$ being permitted to project above the top surface of the tearer-frame.

The tearer-frame is provided at one end with suitable gripping fingers 19 each of which is pivoted by means of a pivot pin 20 to its corresponding longitudinal angle-bar 17, the upper side of each angle-bar being cut away to permit the working of the gripping fingers. The lower bent portion of each gripping finger 19 is provided with a slot 21 (see Fig. 7) which is adapted to engage a small roller 22 secured to the inner side of the bar 23 slidably mounted on the longitudinal angle bar 17 by means of a suitable bracket 24 at one end and a bracket 25 at the other end, suitable cross-bars 26 being provided for joining the lower ends of the respective brackets 25 together. The outer ends of the bars 23 are connected by means of a cross-piece 27 having a depending roller 28 (see Fig. 7). Each bar 23 is respectively secured at one end to a spring 29 the other end of which is secured in each instance to the bracket 25, the springs 29 both acting to force the bars 23 to the right to normally hold the gripping fingers 19 in closed position against the seat plates 30, the contact portions of which are preferably faced with rubber or similar material. For purposes of illustration the gripping fingers shown in Fig. 6 are shown in open position.

The tearer-carriages just described are preferably spaced at equal distances about the periphery of the large sprockets 4, and while six of these tearer-carriages are shown, a greater or less number can be used depending upon the distance between successive tears.

The bottom of each tearer is provided with a roller 31 which is adapted to engage a curved cam plate 32 secured to the stationary shaft 3 by means of brackets 321, said cam acting to slide the tearer from the extreme right to the extreme left hand side of the tearer carriage, as the tearer-carriages are rotated in a counter-clockwise direction, the roller 31 of each tearer being adapted to engage a similarly curved cam plate 33 similarly secured to the stationary shaft 3 which acts to slide the tearer from the extreme left to the extreme right hand side of the tearer-carriage. Each tearer is successively moved from its extreme right hand position to its extreme left hand position and back again to its original right hand position for every complete rotation of its respective tearer-carriage on the tearer-drum.

As the tearer-carriages are rotated the rollers 28 on the cross-pieces 27 are adapted to successively engage a circular cam plate 34 secured to the stationary shaft 3 to open the gripping fingers 19 by acting against the action of the springs 29 during a certain portion of the rotation of each tearer carriage.

The tearer carriages so far described operate as follows: Material, hemmed on both sides, which is to be torn, designated by the letter A, is placed or suitably fed over the top of a suitable feeding table 35, suitably supported on the frame of the machine so that the edge of the table will overhang some of the tearer-carriages and be on a level or slightly above the uppermost position of the tearer-carriages. The material A is pulled over the edge of the table and over the top surface of the frame of the tearer-carriage that is adjacent the edge of the table. The material A is held in position on the tearer-carriage by means of its gripping fingers 19 which grip the right hand edges of the material. In this uppermost position of the tearer-carriage its respective tearer, by the action of the cam plate 33, is situated at the extreme right hand side of the carriage, in which position a curved cam plate $n$ secured to the top of the table 35 has engaged the roller $m$ of the contact lever $i$ to raise the contact member $k$ out of engagement with the working face of the bearing shoe $a$, as shown in Figs. 3 and 6. As the uppermost tearer-carriage is rotated through the medium of the large sprockets 4, by means to be described later, in a direction away from the table 35, or in a counter-clockwise direction, the circular cam plate 34 acts to release the gripping fingers 19 so that they will grip the edge of the material and hold it in position. On the further rotation of the uppermost tearer-carriage the curved cam plate 32 acts to move the tearer toward the left, the cam plate $n$ acting to release the contact lever $i$ to bring the contact member $k$ into engagement with the material A when the tearer has been moved a sufficient distance to permit the contact member $k$ to engage the material A inside the right hand hem. On the further movement of the tearer the roller $g$ on the cutting lever $c$ is arranged to engage a cam plate $o$, secured to the frame of the machine, which acts to force the knife $d$ downward to cut the first or right hand hem of the material, the cam plate $o$ acting to release the roller $g$ to permit the knife $d$ to move upward out of cutting position as soon as the right hand hem has been cut. On the further movement of the tearer the hooked portion thereof acts to tear the material transversely until the contact member $k$, which is in advance of the hooked portion of the tearer, has passed over the second or left hand hem of the material and engaged the working face of the tearer which acts to close an electrical circuit to be later described, which operates a curved cam plate $p$, pivotally mounted on the frame of the machine, which acts to engage the roller $f$ to operate the knife $d$ to cut the second or left hand hem thereby severing the material A. The tearer is then moved to the extreme left hand side of the tearer-carriage by the action of the cam plate 32, the tearer being returned in its rotation to the extreme right of the tearer-carriage in position to again tear the material transversely, by the action of the cam plate 33. After the tearer has reached the extreme left hand side of the tearer-carriage and after the material has been torn transversely the circular cam plate 34 acts to engage the roller 28 to raise the gripping fingers 19, so as to release the piece of material after it is torn.

From the above description it will be seen that as the tearer-carriages are rotated, in the operation of the machine, they will each in turn, as they rise to their uppermost position and pass by the edge of the feeding table, engage the material, the gripping fingers 19 of each tearer-carriage acting to grip the edge of the material during the time its respective tearer is tearing the material, after which said gripping fingers are released to drop the torn pieces of material, the cam plates $o$ and $p$ in the meantime acting to operate the knife $d$ at proper intervals to cut both hems. The operation just described is continuous and the distance between successive tears is dependent upon the spacing apart, on the circumference of the large sprockets 4, of adjacent tearer-carriages.

In order to increase the distance between successive tears, without changing the position and number of tearer-carriages on the tearer drum, each tearer-carriage is provided with an adjustable spacer, as shown in Figs. 3 and 6, comprising each a spacing rod 36, an adjusting arm 41, and a lever 42 together with other parts not specially shown nor will the same be described, as it forms no part of the present application.

The present drawings show a machine provided with a piling device for engaging each piece of torn material and piling it, together with pieces of previously torn material, in an orderly manner, but as this piling device forms no part of the present invention it will not be described.

The tearer-drum, comprising the sprockets 4 upon which the tearer-carriages are mounted as above described, is rotated by means of sprocket chains 50 which are adapted to engage the sprockets 4 for a portion of their circumference suitable sprocket wheels 52, 53 and 54 being provided for holding the same in position, the sprocket wheel 54 being secured to a suitable power shaft 55 having a driving pulley 76.

The curved cam plate $p$, before referred to, which engages the roller $f$ to operate the knife $d$ to cut the second or left hand hem, is secured on its underside to a bar $q$ which is supported upon the outer ends of suitable bent rods $r$, the inner ends of which are secured to a shaft $s$ rotatably mounted upon a suitable bracket $t$ secured to the side of the frame of the machine. The outer end of the shaft $s$ is secured to one end of a bent arm $u$ which is pivotally connected at its outer end to one end of a rod $v$ which is pivotally connected at its other end to one end of a bell crank lever $w$ pivotally mounted on the frame of the machine. The other end of the bell crank lever $w$ is pivotally connected to one end of a rod $x$, the other end of which is connected to one end of a short lever $y$ which is loosely mounted at its other end on a short shaft $z$ mounted in a suitable bracket B secured to the frame of the machine. The short lever $y$ is provided intermediate of its length with a roller C which is adapted at certain times to be engaged by a cam D loosely mounted on a shaft E which is rotatably mounted in the ends of the bracket B.

From the above description it will be seen that when in the operation of the machine the cam D is operated to force the end of the lever $y$ upward the rod $v$ acts to force the curved cam plate $p$ upward, so as to engage the roller $f$ to operate the knife $d$ to cut the second or left hand hem before referred to.

The cam D in the present instance is connected to a suitable plate F upon which is mounted by means of a suitable pin G a brake band H which is adapted at certain times to grip the brake wheel J secured to the shaft E. The free end of the brake band H is provided with an adjustable link K which is secured to a trip lever L one end of which is pivoted on the pin G. The trip lever L is connected to one end of a spring M the other end of which is secured to the plate F, said spring acting when not restrained to force the brake band H into engagement with the brake wheel J so as to operate the cam D.

Suitably secured to the bracket B is an electro-magnet N having an armature O pivoted at one end to the bracket B and provided with a spring P which acts to hold said armature out of engagement with the magnet N. The end of the armature O is provided with a notch Q which is adapted to engage the end of the trip lever L which acts when held in such position to hold the brake band H out of engagement with the brake wheel J so that the brake wheel can freely rotate on the shaft E, to which it is secured, while the cam D remains at rest, in which position the curved cam plate $p$ is in its lower position.

The magnet N is electrically connected to the curved cam plate $p$, as shown diagrammatically in Fig. 10, by means of a wire R. The magnet N is also connected to a battery S by means of a wire T, the battery S being connected by means of a wire U to one end of a contact arm V, the outer end of which rests upon a contact pin W secured to the plate F which is electrically connected by means of a ground wire X to the bearing shoe $a$. The ground wire X is shown in Fig. 10 to make the electrical diagram complete, in the other figures the bearing shoe $a$ is grounded to the frame of the machine, making the use of the ground wire X unnecessary.

From the above description it will be seen that the contact member $k$ of each tearer, as it passes over the material, is insulated from the bearing shoe $a$, but as soon as the contact member $k$ passes over the second or left hand hem it makes contact with the bearing shoe of the tearer so as to operate the magnet N the roller $f$ on the cutting lever having already come into engagement with the upper surface of the curved cam plate $p$. As soon as the magnet N is operated by the closing of the circuit the armature O releases the trip lever L, the spring M acting to force the brake band H into engagement with the brake wheel J to turn the cam D one complete revolution, which acts to force the end of the lever $y$ upward, the rod $v$ acting to force the curved cam plate $p$ upward, so as to engage the roller $f$ to operate the knife $d$ to cut the second or left hand hem before referred to.

As soon as the trip lever L has made one complete revolution the same again comes into contact with the notch Q of the armature O thereby resetting the tripping device with the pin W again in contact with the contact arm V, so that when the succeeding contact member $k$ of the succeeding tearer passes over the second or left hand hem to again close the circuit, the magnet N will be again operated to operate its knife $d$ to cut said hem.

In order to insure the return of the armature O to its retracted position after it has been operated the same is connected by means of a hooked wire Y to a lever Z loosely mounted at one end on the shaft $z$, the free end of the lever Z having a roller $a'$ which is adapted to engage a cam $b'$ secured to a spacer $c'$ secured to the cam D, so that when the cam D is rotated as before described the cam $b'$ is also rotated and acts to pull the armature O upward as soon as it has released the trip lever L.

The shaft E is provided with a sprocket wheel $d'$ which is adapted to engage a sprocket chain $e'$ which passes over a sprocket wheel $f'$ secured to the power shaft by means of which the shaft E is continually rotated. The curved cam plate $p$ is made relatively long so that the machine can, without any special adjustment, cut material of various widths hemmed on both sides.

While the invention has been described with particular reference to the details of construction, and with special reference to my copending application Serial No. 86,273, filed March 23, 1916, it is not to be considered as limited thereto, as many changes can be made and still fall within the scope of the invention set forth in the following claims.

What I claim is:—

1. A tearing machine for tearing transversely strips of material hemmed on both sides, comprising means for cutting one hemmed side, means for tearing the material between the hemmed sides, and means for advancing the cutter to the other hemmed side and for causing it to sever such hemmed side.

2. A tearing machine for tearing transversely strips of material hemmed on both sides, comprising a tearer having a knife mounted thereon, means for operating said knife to cut one of the hemmed sides, means for operating said tearer to tear the material between the hemmed sides, and means for operating the knife to cut the other hemmed side to sever the material transversely.

3. A tearing machine for tearing transversely strips of material hemmed on both sides, comprising a tearer having a knife mounted thereon, cam actuated means for operating said knife to cut one of the hemmed sides, cam actuated means for operating said tearer to tear the material between the hemmed sides, and electrically controlled means for operating the knife to cut the other hemmed side to sever the material transversely.

4. A tearing machine for tearing transversely strips of material hemmed on both sides, comprising a tearer having a knife mounted thereon, means for operating said knife to cut one of the hemmed sides, means for operating said tearer to tear the material between the hemmed sides, and means for operating said knife to cut the other hemmed side at the conclusion of the tearing operation of the tearer to sever the material transversely.

5. A tearing machine for tearing transversely strips of material hemmed on both sides comprising in combination a movable carrier having means for gripping the material to be torn, a tearer, a knife on said tearer means for moving said tearer transversely across the material and means for operating said knife to cut the hemmed sides of the material.

6. A tearing machine for tearing transversely strips of material hemmed on both sides comprising a tearer having a knife mounted thereon, means for moving said tearer transversely across the material and means for operating said knife to cut the hemmed sides of the material.

7. A tearing machine for tearing transversely strips of material hemmed on both sides comprising a tearer, a cutting lever mounted on said tearer, a knife on said cutting lever, means for operating said knife to cut the first hem of the material, means for moving said tearer transversely across the material to tear the same, a contact lever mounted on said tearer arranged to slide over said material in advance of the tearing edge of said tearer, a movable cam plate, said contact lever being arranged to operate said movable cam plate to operate said knife to cut the second hem as soon as said contact lever passes over said second hem.

8. A tearing machine for tearing transversely strips of material hemmed on both sides comprising a tearer, a cutting lever mounted on said tearer, a knife on said cutting lever, means for operating said knife to cut the first hem of the material, means for moving said tearer transversely across the material to tear the same, a contact lever mounted on said tearer arranged to slide over said material in advance of the tearing edge of said tearer, a movable cam plate, said contact lever being arranged to operate said knife to cut the second hem as soon as said contact lever passes over said second hem.

9. A tearing machine for tearing transversely strips of material hemmed on both sides comprising a tearer, a knife mounted on said tearer, means for operating said knife to cut the first hem of the material, means for moving said tearer transversely across the material to tear the same, and electrically controlled means for operating said knife to cut the second hem.

10. A tearing machine for tearing transversely strips of material hemmed on both sides comprising a tearer, a knife mounted on said tearer, means for operating said knife to cut the first hem of the material, means for moving said tearer transversely across the material to tear the same, and a cam plate for operating said knife to cut the second hem.

11. A tearing machine for tearing transversely strips of material hemmed on both sides comprising a tearer, a knife mounted on said tearer, means for operating said knife to cut the first hem of the material, means for moving said tearer transversely across the material to tear the same, and means controlled by the width of the material for operating the knife to cut the second hem.

12. A tearing machine for tearing transversely strips of material hemmed on both sides comprising a tearer, a knife mounted on said tearer, means for operating said knife to cut the first hem of the material, means for moving said tearer transversely across the material to tear the same, and electrical means controlled by the width of the material for operating the knife to cut the second hem.

13. A tearing machine for tearing transversely strips of material hemmed on both sides, comprising means for cutting the hemmed sides, means for tearing the material therebetween, and means for maintaining the cutting means in an inoperative position during the operation of the tearing means.

14. A tearing machine for tearing transversely strips of material hemmed on both sides, comprising successively operated means for cutting one hem, and tearing the intervening material, and means for causing the first cutting means to sever the other hem.

In testimony whereof I have signed this specification in the presence of two subscribing witnesses.

THOMAS ALLATT.

Witnesses:
 LEO J. MATTY,
 PAUL H. FRANKE.

Copies of this patent may be obtained for five cents each, by addressing the "Commissioner of Patents, Washington, D. C."